Figures 1, 2:
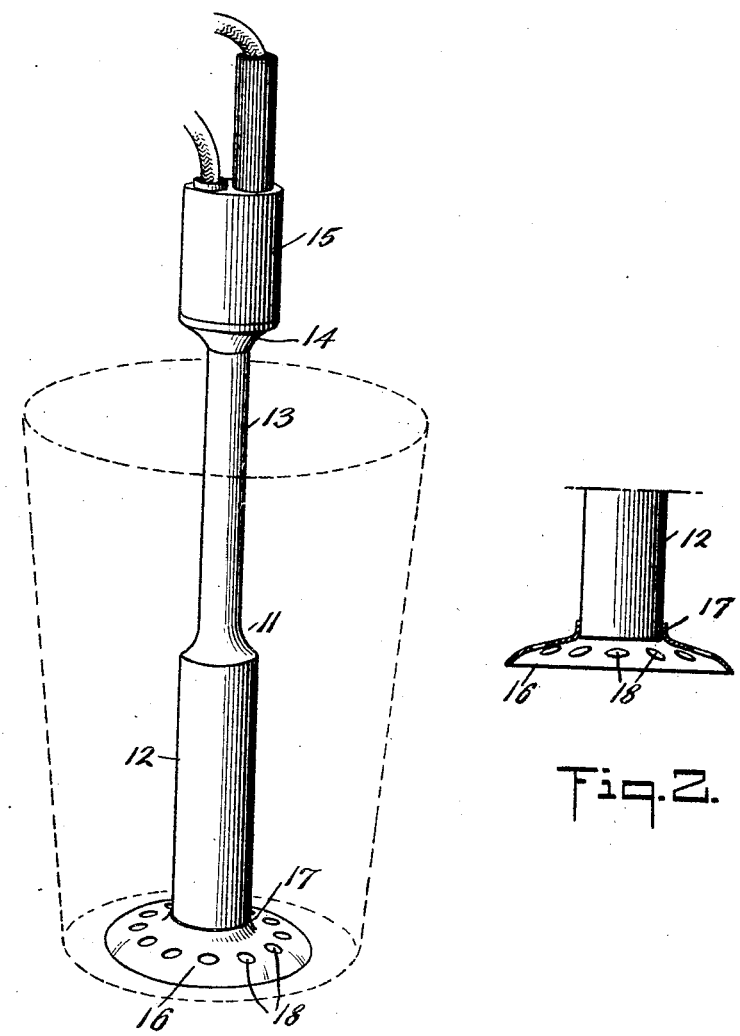

Jan. 12, 1926.

A. A. WARNER 1,569,102

IMMERSION HEATER

Filed Nov. 6, 1923

INVENTOR
Alonzo A. Warner
BY
ATTORNEYS

Patented Jan. 12, 1926.

1,569,102

UNITED STATES PATENT OFFICE.

ALONZO A. WARNER, OF NEW BRITAIN, CONNECTICUT, ASSIGNOR TO LANDERS, FRARY & CLARK, OF NEW BRITAIN, CONNECTICUT, A CORPORATION OF CONNECTICUT.

IMMERSION HEATER.

Application filed November 6, 1923. Serial No. 673,069.

*To all whom it may concern:*

Be it known that I, ALONZO A. WARNER, a citizen of the United States, residing at New Britain, county of Hartford, and State of Connecticut, have invented certain new and useful Improvements in Immersion Heaters, fully described and represented in the following specification and the accompanying drawings, forming a part of the same.

This invention relates to immersion heaters.

Immersion heaters of a known type comprise an elongated casing which contains an electric resistance heating unit and part of which serves as a handle. These heaters are used by immersing them in the material to be heated and have been found of great convenience in heating relatively small volumes of water, milk and the like.

The casing itself, in the type of heaters referred to, is usually of relatively small diameter and will not stand upright. Attachment devices are known for enabling a heater to stand upright but they have been expensive to manufacture and inconvenient to use.

It is the principal object of the present invention to provide an immersion heater that has an element for enabling the heater to stand upright and for elevating the heated end from a table or the like on which the heater may be placed, in which such element is part of the heater rather than an optional attachment and such that the heater as a whole is economical to manufacture and easy to assemble.

With this general object in view, the invention consists in the heater which will first be described in connection with the accompanying drawing and then more particularly pointed out.

In the drawing—

Figure 1 is a perspective view of an immersion heater constructed in accordance with the invention; and, Figure 2 is a sectional view taken through the foot of the heater.

Referring to the drawing, the heater here illustrated by way of example comprises an elongated casing 11 having its lower part 12 arranged to enclose an electric resistance element which is not shown as such elements are well known in the art. The upper part 13 of the casing, which is somewhat reduced in diameter, serves as a handle and encloses the electric conductors that lead to the heating element. At the upper end of the handle is a shoulder 14 for receiving an electric plug or connecting element, indicated at 15, by which the heating element may be connected in a circuit.

At the foot of the heater casing is a plate 16. As here shown as an example, the plate 16, which is annular in form, has at its inner edge an upturned flange 17 dimensioned to fit over the end of the heater casing. The plate 16 is slightly dome-shaped. That is, it curves outwardly and downwardly from the flange 17 to its outer edge. The plate 16 is fixedly attached to the heater casing by welding, soldering or otherwise securing the flange 17 to the casing.

The plate 16 has a diameter substantially greater than the diameter of the heater casing. When the heater is immersed in a glass of water, for example, it can stand upright instead of being compelled to lean against the glass. Furthermore, if the heater is laid on a table or the like, inadvertently, with the current on, the lower and heated end of the casing is elevated from the table by the plate, the edge of which engages the table.

In the heater here shown, the plate 16 is provided with an annular row of perforations 18. These serve to facilitate easy immersion of the heater and also serve to insulate the outer edge of the plate 16.

The heater described not only provides an effective construction but is economical to manufacture, as the plate 16 can be made by a single stamping operation and is easily assembled and fixed in place.

The operation of the device will be clear from the above description.

What I claim is:

An immersion heater comprising an elongated casing for entirely enclosing a heating unit, and an annular plate fixedly attached to the foot of said casing, said plate having a diameter substantially greater than the diameter of the casing and curving outwardly and downwardly from the casing to serve as a stand to hold the heater upright in a receptacle and as a guard to hold the heater a safe distance away from a surface when laid on its side, the plate having a plurality of perforations which serve to facilitate immersion and aid in insulating the periphery of the plate from the heat generated in the casing.

In testimony whereof, I have hereunto set my hand.

ALONZO A. WARNER.